J. W. FILBEY.
DAMPER.
APPLICATION FILED MAR. 24, 1917.
1,230,882.
Patented June 26, 1917.
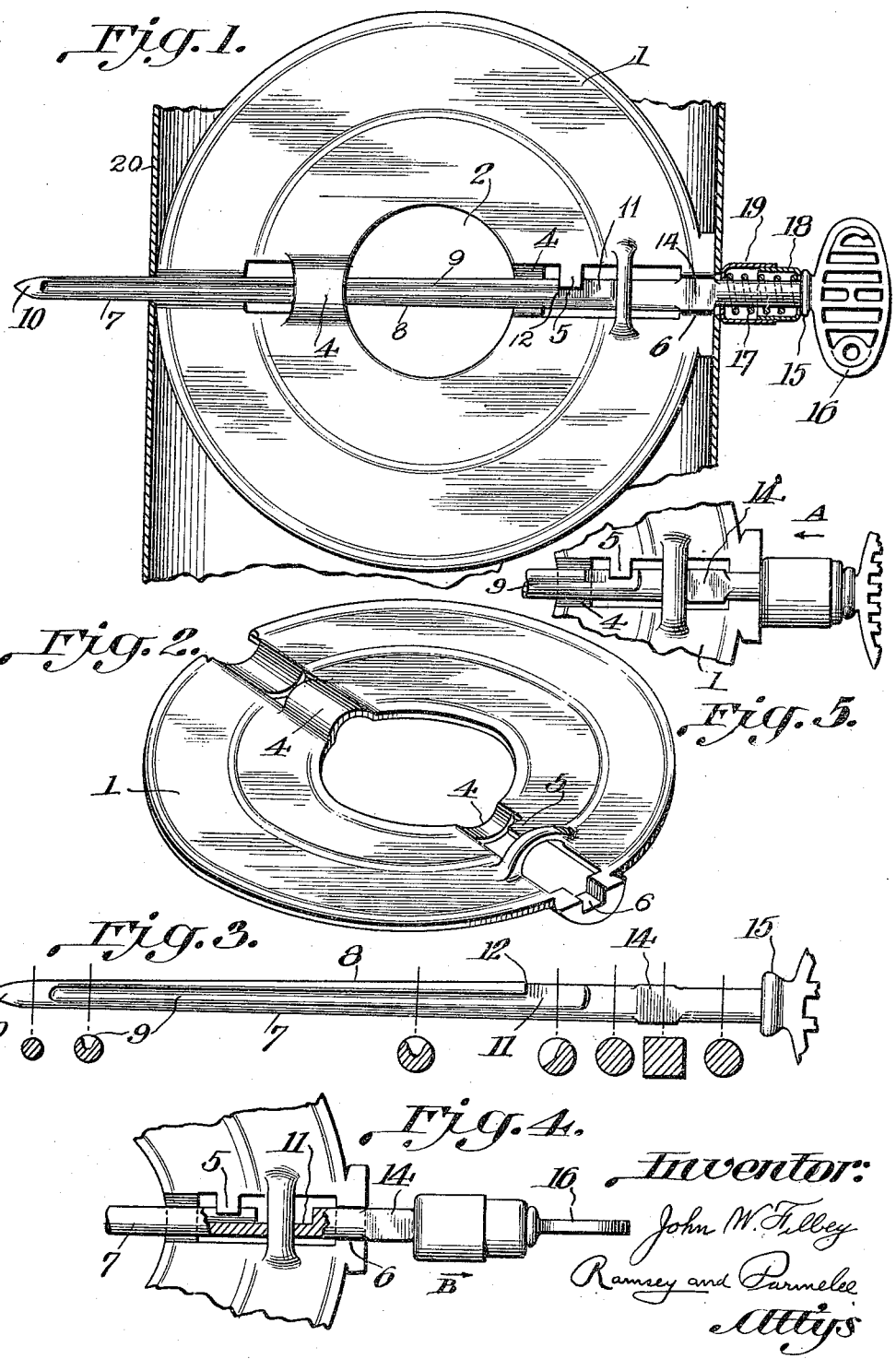

UNITED STATES PATENT OFFICE.

JOHN W. FILBEY, OF WRIGHTSVILLE, PENNSYLVANIA, ASSIGNOR TO WRIGHTSVILLE HARDWARE COMPANY, OF WRIGHTSVILLE, PENNSYLVANIA, A CORPORATION OF PENNSYLVANIA.

DAMPER.

1,230,882.     Specification of Letters Patent.     Patented June 26, 1917.

Application filed March 24, 1917. Serial No. 157,085.

*To all whom it may concern:*

Be it known that I, JOHN W. FILBEY, a citizen of the United States, and a resident of the city of Wrightsville, in the county of York, State of Pennsylvania, have invented certain new and useful Improvements in Dampers, of which the following is a specification.

This invention relates broadly to the art of stoves and furnaces and more particularly to a damper.

The principal object of the present invention is to provide a damper for stove pipes and the like wherein the pivot rod of the damper is constructed to securely interlock with the damper plate by a rotary and endwise movement of the rod relatively to the plate and wherein the rod is not provided with projections which necessitate relatively large openings in the pipe to permit insertion of the pivot rod through the walls of the pipe.

A more specific object of the present invention comprises a damper plate provided with guide arches for the pivot rod and a projection extending into the path of the pivot rod with an interlocking recess adjacent the projection, and a pivot rod provided with a stop constructed to engage with the projection when the interlocking portion of the pivot rod is in engagement with the interlocking recess on the damper plate and the pivot rod is further provided with a longitudinal groove adapted to receive the projection and enable the pivot rod to be inserted through the guide arches of the damper plate to assemble the pivot rod and damper plate. Furthermore, the pivot rod is provided with a housed compression spring performing the double function of a friction brake when the damper is in position in the pipe and normally retaining the pivot rod with the stop against the projection and the interlocking members in engagement.

Other and further objects of the present invention will in part be obvious and will in part be pointed out hereinafter in the specification following by reference to the accompanying drawings wherein like parts are designated by like characters throughout the several figures thereof.

Figure 1 is a plan view illustrating the parts assembled within a section of stove pipe.

Fig. 2 is a perspective view of the damper plate.

Fig. 3 is a perspective view of the pivot rod and shows cross sections of the rod at various intervals.

Fig. 4 is a detail view illustrating the position of the parts during assembly as when the pivot rod is being inserted in or withdrawn from the damper plate.

Fig. 5 also is a detail view illustrating the parts during assembly and showing the pivot rod pushed inwardly to compress the housed spring to its limit of compression.

Various types of interlocking damper plates and pivot rods have heretofore been designed in the art so that the present invention is more or less specific in character.

Heretofore in the art it has been customary to provide pivot rods of irregular cross-section whereby the cross-section of the rod was larger than the opening in the wall of the pipe in which the rod turned when the damper was assembled within the pipe, which obviously is objectionable. Also it has been common in the prior art to provide pivot rods with outstanding projections which required larger openings and introduced a troublesome element in the casting of the pivot rod.

The present invention resides more particularly in the production of a damper comprising a damper plate and a pivot rod having peculiar characteristics and wherein no outstanding projections are formed on the pivot rod, which rod is preferably pointed and may be used as the instrument for puncturing the stove pipe to produce the openings comprising the bearings for the pivot rod.

Referring now more particularly to the drawings, the damper plate 1 is provided with the usual minimum draft opening 2 and is formed with a plurality of oppositely disposed guide or keeper arches 4 that form suitable receiving members for the pivot rod. A projection 5 extends inwardly into the normal path of the pivot rod and coöperates with the squared interlocking recess 6 to retain the pivot rod and damper plate interlocked. The pivot rod 7 comprises a tapering portion 8 which is substantially cylindrical in outline with the exception that one side is provided with a longitudinal groove 9, and the end of the pivot rod, as at 10, is preferably cylindrical in outline and pointed. One side wall of the groove 9 is cut away for a short distance, as at 11, adjacent the inner end of the pivot rod to provide a stop 12, which coöperates with the projection 5 on the damper plate 1 when the parts are assembled. The cut away portion 11 is of sufficient length to permit a longitudinal movement of the rod relatively to the stop 5 for purposes hereinafter to be more fully described. Adjacent the cut away portion the pivot rod is squared in outline, as at 14. This squared portion is constructed to exactly fit and interlock with a squared recess 6 in the damper plate. The pivot rod is again rounded beyond the squared portion and terminates in a shoulder 15 beyond which extends the thumb piece 16. A coiled spring 17 is mounted within housing cups 18 and 19 which are constructed to telescope and which are seated between the shoulder 15 and the wall of the stove pipe 20. It is to be noted that when the parts are in assembled relation, as indicated in Fig. 1, the normal operation of the spring 17 is to seat the projection 5 against the shoulder 15 which prevents the spring 17 from withdrawing the pivot rod from the damper plate and at the same time maintains the squared portion 14 on the pivot rod in interlocking engagement with the squared recess 6 on the damper plate. In this position it is obvious that the damper plate is securely and fixedly interlocked with the pivot rod so that any turning of the pivot rod will turn the damper plate.

Referring now to Fig. 5 it will be noted that the pivot rod has been pushed inwardly in the direction of the arrow A thereby disengaging the squared portion 14 on the pivot rod from the interlocking recess 6 in the damper plate. In this position the pivot rod may be turned through substantially ninety degrees (90°) or until the groove 9 is alined with the projection 5 on the damper plate. When in this position the pivot rod may be withdrawn or inserted relatively to the damper plate by a longitudinal movement indicated by the arrow B in Fig. 4.

Realizing that this invention may be embodied in structures other than the specific disclosure herewith I desire that this disclosure be understood as including suitable equivalents and be understood as illustrative with no further limitations than are imposed by the known prior art.

Having thus described my invention what I claim is:

1. In a damper for stove pipes and the like, a damper plate provided with a minimum draft opening in substantially the center thereof and having a passageway for a suitable pivot rod, said passageway comprising oppositely disposed arches adapted to extend on opposite sides of a suitable pivot rod, a projection comprising a relatively flat member extending from the damper plate into said passageway in substantially the same plane as the said damper plate, an interlocking member formed in one end of said passageway and comprising a squared recess, in combination with a pivot rod having a pointed end and being provided with a groove extending longitudinally of said pivot rod, a squared portion on said pivot rod adapted to fit into and interlock with the interlocking recess on the damper plate, a stop adjacent said squared portion and constructed to coöperate with said projection, and a spring for normally retaining said squared portion within said interlocking recess and said stop in engagement with said projection.

2. In a damper for stove pipes and the like, a damper plate provided with a passageway for a pivot rod, said passageway comprising arched members spaced apart and being oppositely disposed on each side of the axis of said passageway, said damper plate being provided with an interlocking recess adjacent one end of said passageway and alined therewith, a projection extending from said damper plate into said passageway, in combination with a pivot rod having a longitudinally extending groove adapted to accommodate said projection when said pivot rod is inserted across said damper plate, a stop formed on said pivot rod adjacent one end of the groove and a space adjacent said stop to accommodate said projection when said pivot rod is moved endwise after having been inserted across said damper plate and turned to enable the stop to engage the projection, a squared portion on said pivot rod and adapted to engage and interlock with the interlocking recess on said damper plate, and a suitable spring coöperating with said pivot rod to maintain said projection in engagement with said stop and to maintain said squared portion within the said recess.

3. As an article of manufacture, a pivot rod for dampers and the like comprising a longitudinally extending rod provided with a pointed end and having a groove extending lengthwise of the said member, a stop formed adjacent one end of said groove, a squared portion adapted to interlock with an interlocking recess provided in a suitable damper plate, a cylindrical portion adapted to comprise a bearing when the pivot rod is in a suitable stove pipe, and a handle adjacent to said cylindrical portion, substantially as described.

JOHN W. FILBEY.